Patented June 17, 1924.

1,498,269

UNITED STATES PATENT OFFICE.

JOHN J. HARRIS, OF HARDING, MONTANA.

ADHESIVE MATERIAL.

Application filed October 4, 1922. Serial No. 592,425.

*To all whom it may concern:*

Be it known that I, JOHN J. HARRIS, a citizen of the United States, residing at Harding, in the county of Big Horn and State of Montana, have invented a new and useful Improvement in Adhesive Materials, of which the following is a specification.

In accordance with the present invention, an adhesive base material, which may suitably be amylaceous, gelatinous or gummy in character, is intimately admixed with native collodial clay in suitable proportion and the mixture dispersed in water for the formation of an adhesive material.

The native colloidal clay used in carrying out this invention is the mineral usually designated as bentonite, although sometimes by other names. The material itself is frequently found to have some adhesive powers when dispersed in water and it indicates to some extent its colloidal characteristics by the fact that when placed in water, a perceptible swelling and gelatinization of the material is noted.

The adhesive base material and the clay may be employed in varying proportions; for example, from 1 to 6 parts of the clay to one part of the adhesive base material may be used. Thus, with glue or dextrin, as high as 5 parts of clay may be used with one part of adhesive base with satisfactory results. With gum tragacanth and gum arabic the colloidal clay may be employed in proportions up to 6 parts of the clay to one of the gum. With starchy materials such as rice flour, corn starch, tapioca flour, potato starch and the like, from 1 to 5 parts of the clay may be employed for each part of the starchy material.

In preparing the adhesive paste in accordance with the present invention the native colloidal clay, preferably previously ground, is intimately admixed with the ground base material, which may be, for example, rice, potato, or tapioca flour, and water is incorporated into the mixture in the same manner as in preparing a paste from the base material alone. Thus, in the case of starchy base materials the paste must be cooked in the usual manner until the starchy material is suitably gelatinized, unless previously gelatinized starch is employed. The proportions of water used may vary from 5 to 40 times the amount by weight of the admixed adhesive base material and clay, the presence of the clay permitting the incorporation of very much larger quantities of water into the paste without loss of adhesive properties. For commercial purposes a range of 5 to 15 times the amount of water is preferred. The presence of the colloidal clay likewise appears to prevent cockling when the paste is employed for mounting photographs or similar thin sheets of paper, probably by reason of the extreme state of dispersion and gelatinization which its presence appears to cause in the paste.

It is readily apparent that the adhesive material of the present invention may be prepared in paste form or may be prepared in the form of a powder containing the mixture of colloid clay and adhesive base material, with which the necessary amount of water may be incorporated prior to use.

The adhesive material described may be employed as a mounting paste, as a size, or may be employed for any of the uses to which adhesive pastes are ordinarily put. For example, it may be admixed with a suitable proportion of a filler such as whiting and used in the preparation of stereotype matrices. By substituting alcohol, syrup, glycerine, etc. or mixtures thereof for part of the water, a paste suitable for application to metal is formed.

I claim:

1. The method of preparing an adhesive material which comprises intimately admixing bentonite with an adhesive base material and subsequently incorporating water into the mixture.

2. The method of preparing an adhesive base material which comprises intimately admixing a starchy material and bentonite, incorporating water into the mixture and gelatinizing the starchy material.

3. An adhesive material comprising an adhesive base material and bentonite intimately admixed therewith.

4. An adhesive material comprising a starchy material and bentonite intimately admixed therewith.

5. An adhesive material comprising a starchy material and bentonite in the proportion of 1 to 5 parts of colloidal clay to each part of starchy material.

6. An adhesive material comprising water and an adhesive base and bentonite dispersed therethrough.

7. An adhesive material comprising water, 5 to 40 parts, and one part of a mixture of adhesive base and bentonite dispersed therein.

JOHN J. HARRIS.